No. 771,136. PATENTED SEPT. 27, 1904.
G. A. FREDENBURGH.
THREAD DRESSING MACHINE.
APPLICATION FILED FEB. 28, 1903.
NO MODEL. 6 SHEETS—SHEET 1.

WITNESSES. INVENTOR.
Daniel E. Locke George A. Fredenburgh
By Charles T. Hannigan
Attorney.

No. 771,136. PATENTED SEPT. 27, 1904.
G. A. FREDENBURGH.
THREAD DRESSING MACHINE.
APPLICATION FILED FEB. 28, 1903.
NO MODEL. 6 SHEETS—SHEET 4.

WITNESSES. INVENTOR.
Daniel E. Locke George A. Fredenburgh
Elmer Walker By Charles T. Hannigan,
Attorney.

No. 771,136. PATENTED SEPT. 27, 1904.
G. A. FREDENBURGH.
THREAD DRESSING MACHINE.
APPLICATION FILED FEB. 28, 1903.
NO MODEL. 6 SHEETS—SHEET 5.
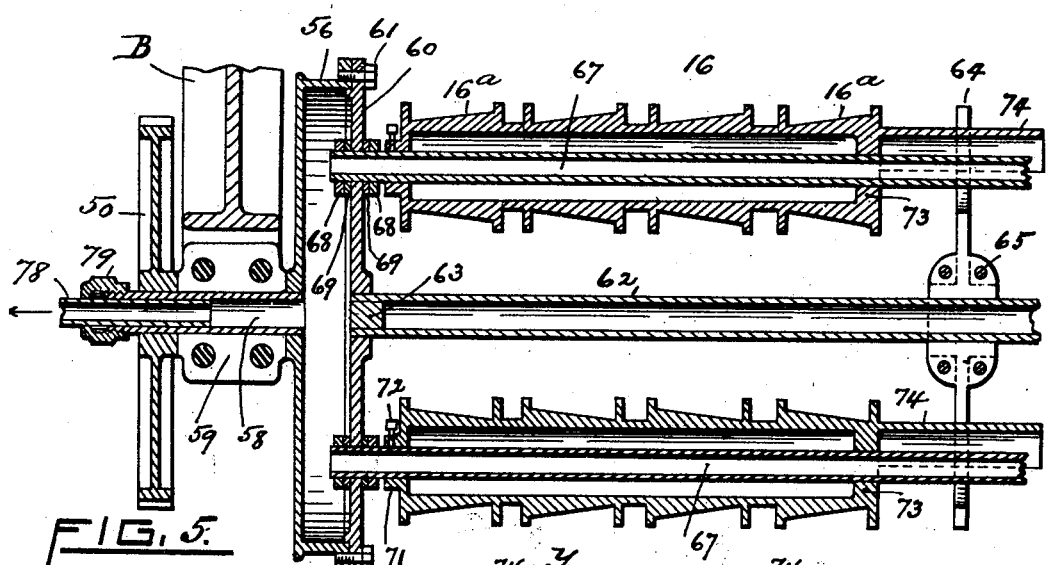
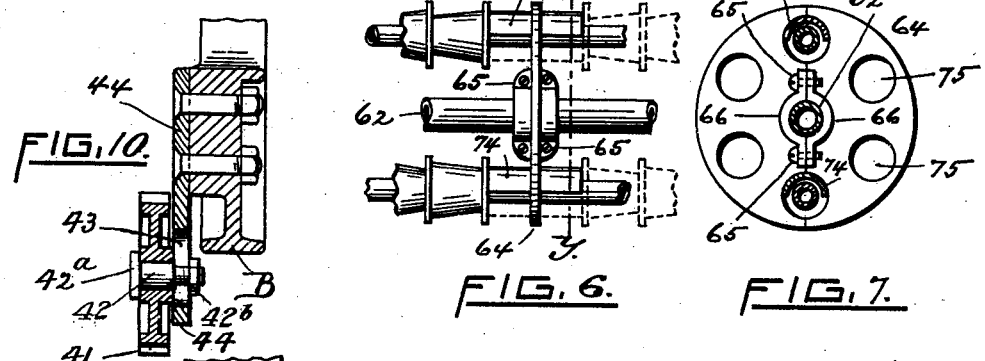
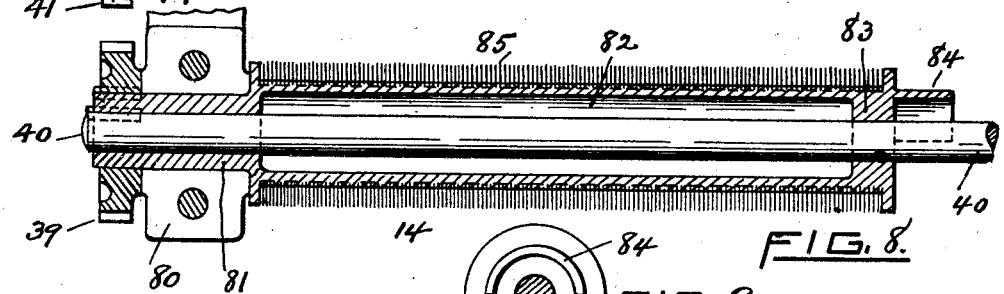
WITNESSES. INVENTOR,
Daniel E. Locke George A. Fredenburgh
Elmer Walker by Charles F. Hannigan
Attorney No. 771,136. PATENTED SEPT. 27, 1904.
G. A. FREDENBURGH.
THREAD DRESSING MACHINE.
APPLICATION FILED FEB. 28, 1903.
NO MODEL. 6 SHEETS—SHEET 6.
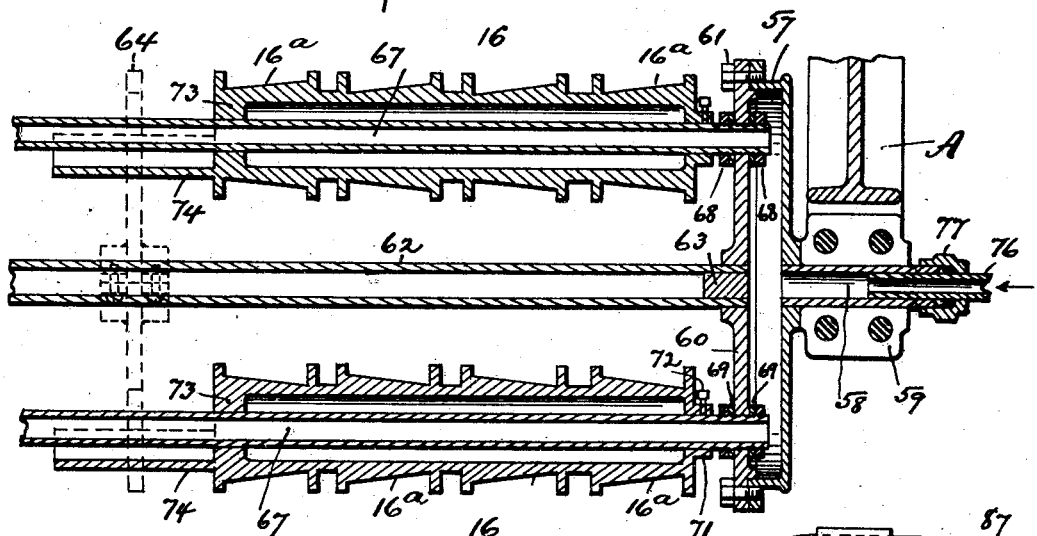
FIG. 11.
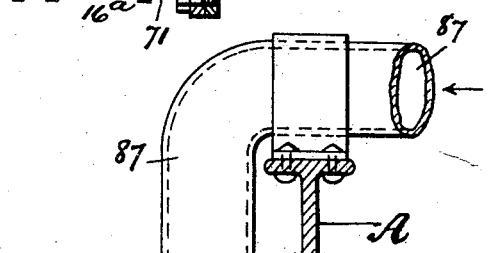
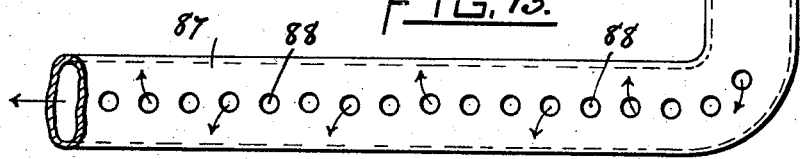
FIG. 13.
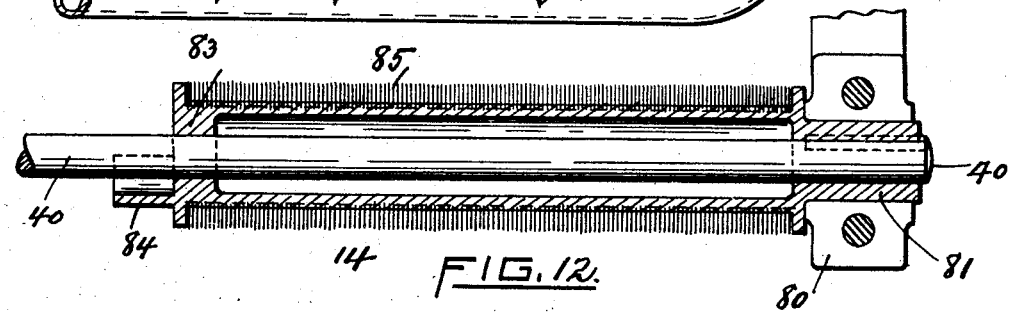
FIG. 12.
WITNESSES,
Daniel E. Locke
Elmer Walker
INVENTOR,
George A. Fredenburgh
By Charles P. Hannigan,
Attorney.

No. 771,136.

Patented September 27, 1904.

UNITED STATES PATENT OFFICE.

GEORGE A. FREDENBURGH, OF PAWTUCKET, RHODE ISLAND.

THREAD-DRESSING MACHINE.

SPECIFICATION forming part of Letters Patent No. 771,136, dated September 27, 1904.

Application filed February 28, 1903. Serial No. 145,587. (No model.)

*To all whom it may concern:*

Be it known that I, GEORGE A. FREDENBURGH, a citizen of the United States, residing at the city of Pawtucket, in the county of Providence and State of Rhode Island, have invented certain new and useful Improvements in Thread-Dressing Machines, of which the following is a specification.

This invention relates to a thread-dressing machine; and the invention consists in the construction of the brushes for laying the projecting fibers of the thread, means for heating the brushes externally, ironers for glazing and polishing the thread, and means to rotate said ironers and said brushes at the proper speed desired, all of the novel construction and combination of parts, as hereinafter fully described, and specifically set forth in the claims.

Like characters indicate like parts.

Figure 1:
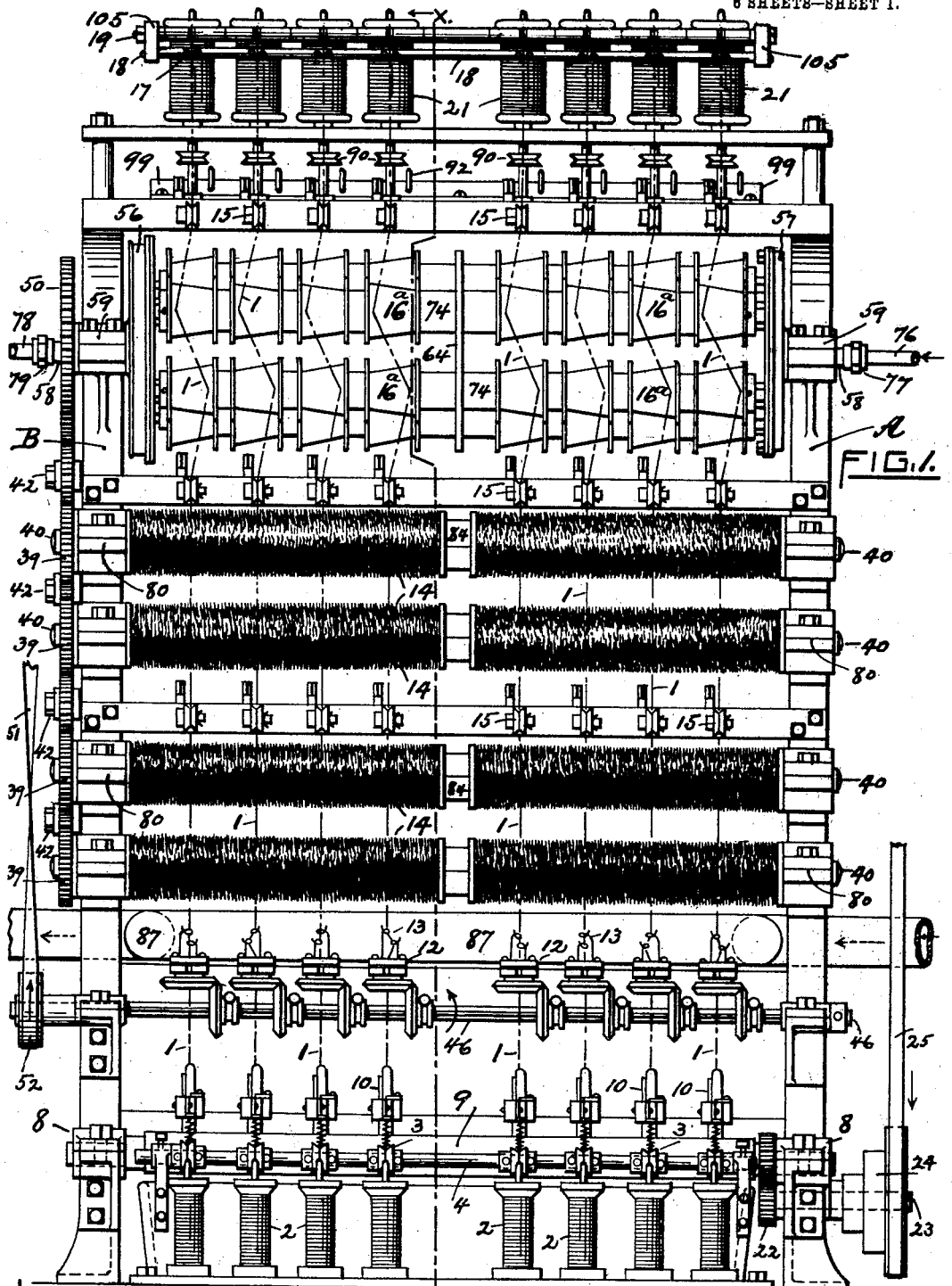
Figure 2:
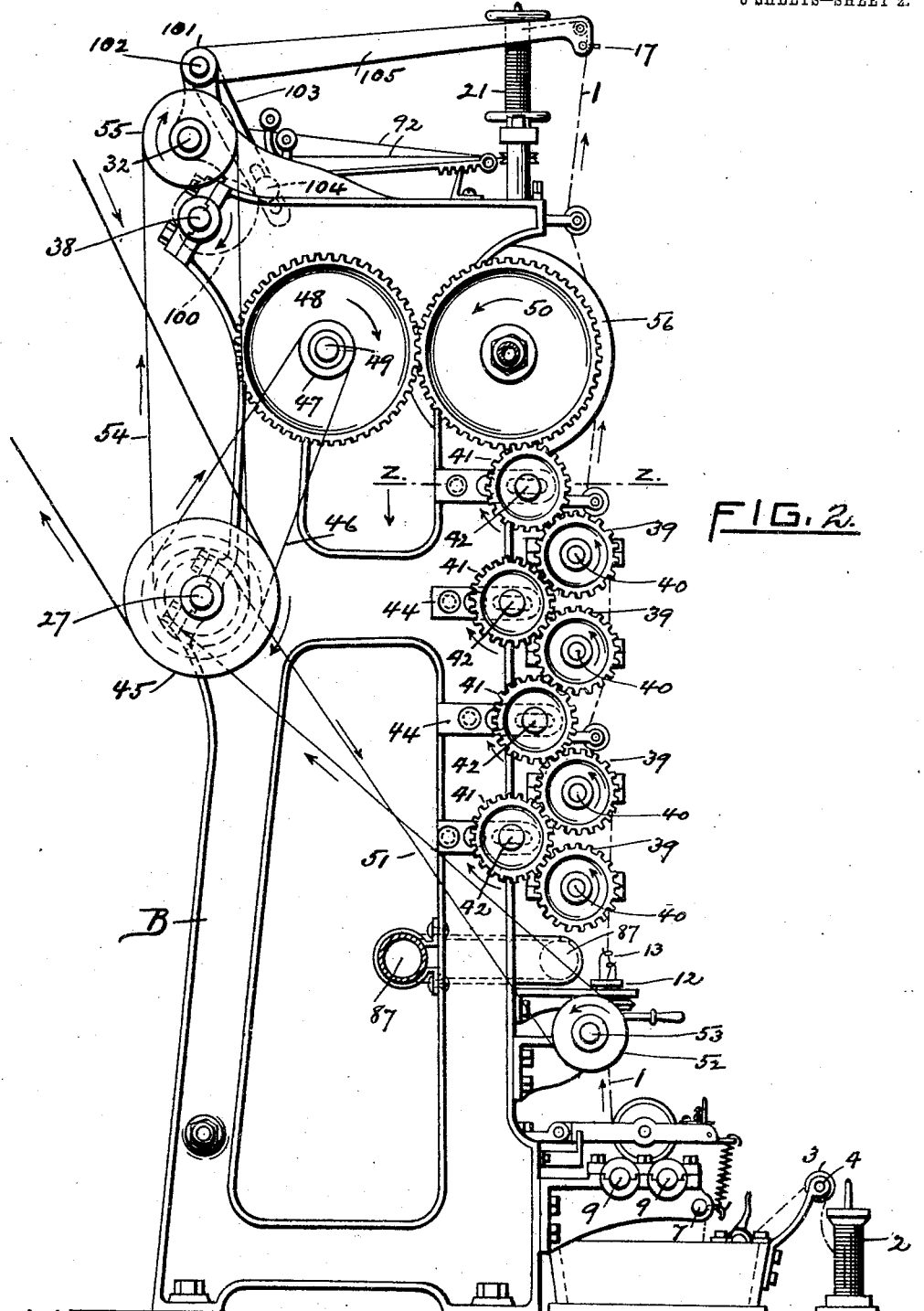
Figure 3:
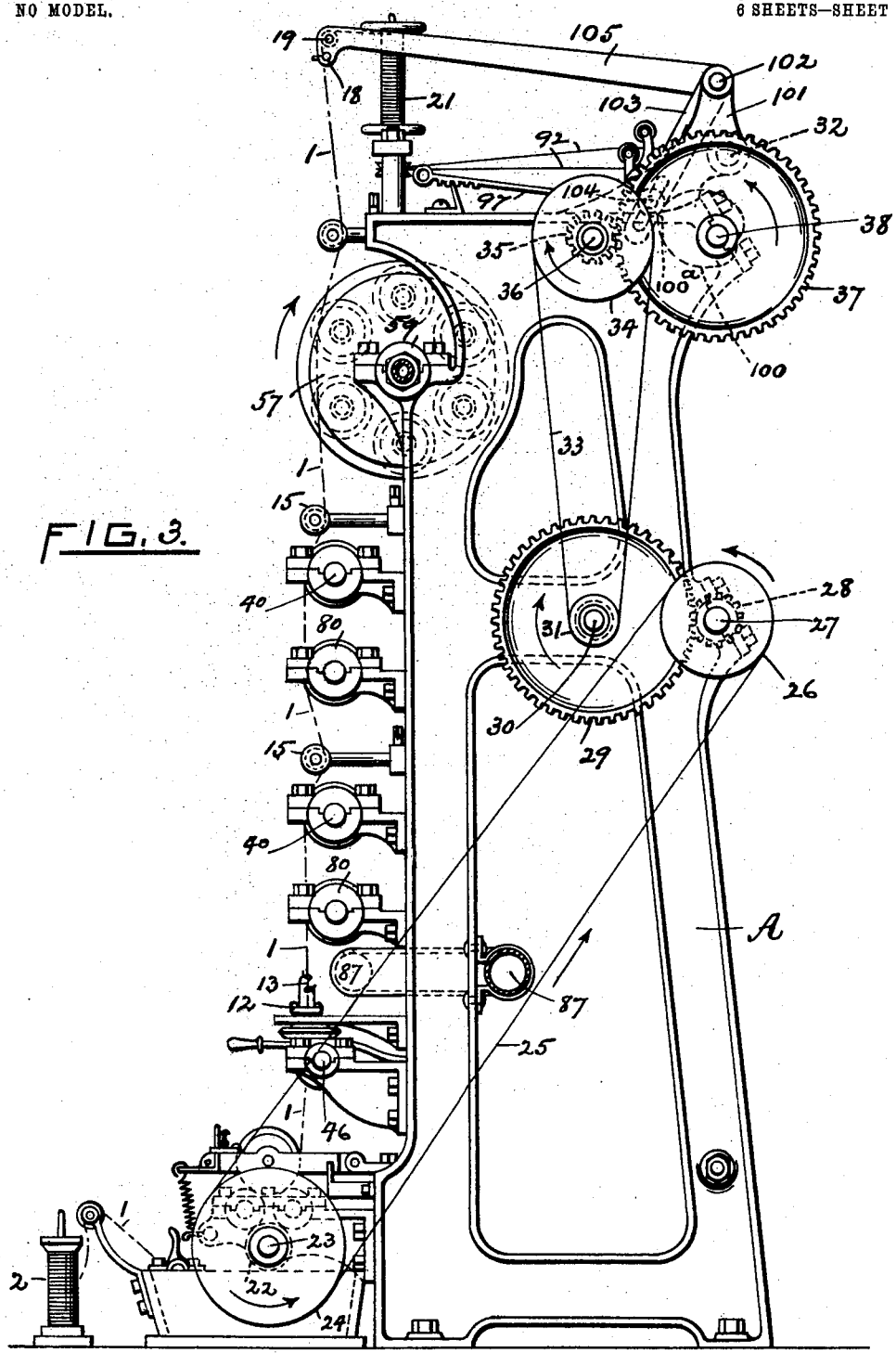
Figure 4:
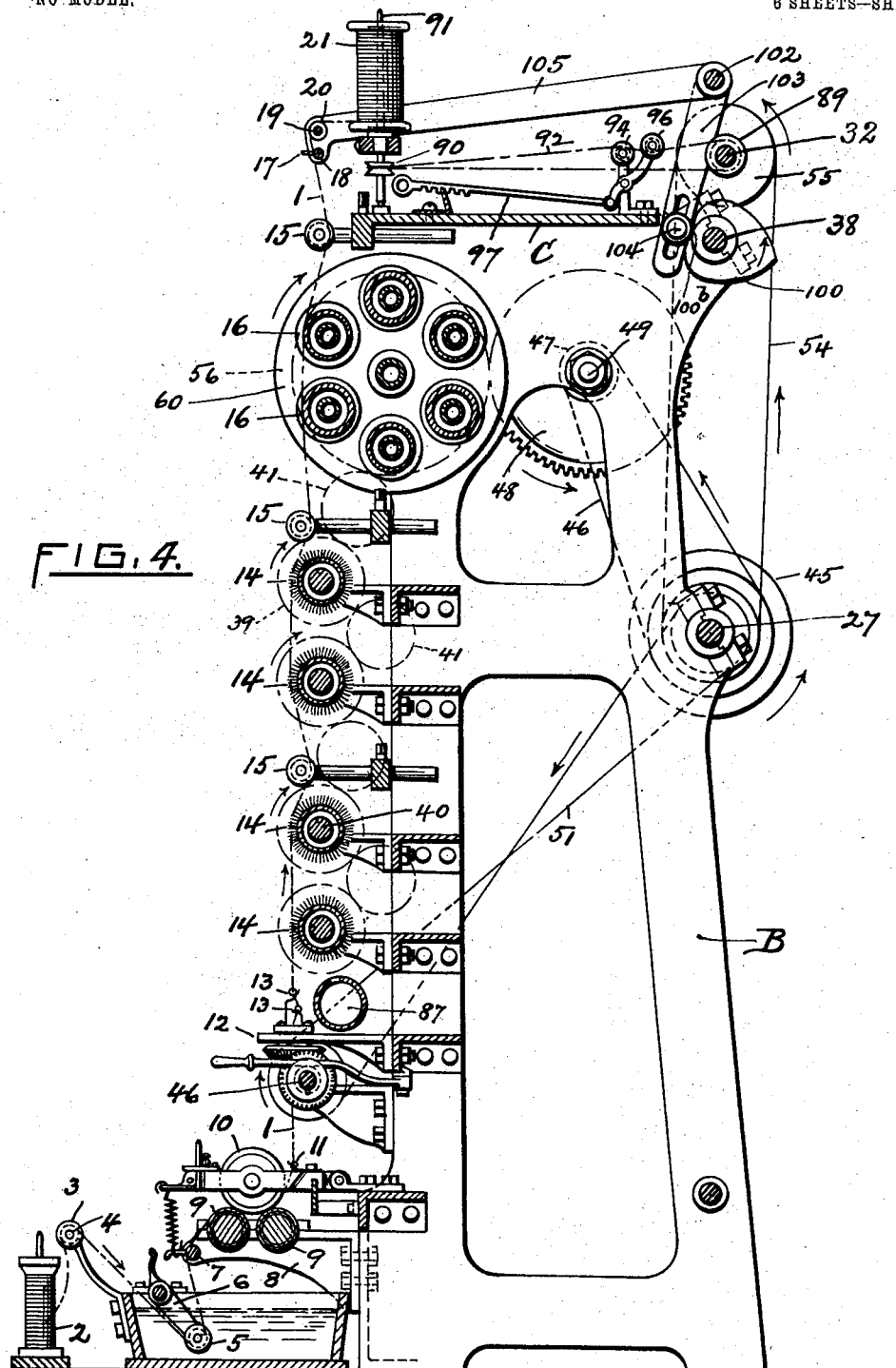

Figure 1 is a front elevation of a thread-dressing machine embodying my improvements. Fig. 2 is an end elevation of the machine, showing the gearing arrangement for rotating the ironers and brushes. Fig. 3 is an elevation view of the opposite end of the machine. Fig. 4 is a vertical cross-sectional elevation of the machine, taken in line $x\ x$ of Fig. 1. Fig. 5 is an enlarged central longitudinal section of the left-hand ironer as supported between a steam-chest and a disk. Fig. 6 is a front elevation of the inner end portion of the ironers as mounted in the disk on a smaller scale. Fig. 7 is a side sectional elevation, taken on line $y\ y$ of Fig. 6. Fig. 8 is an enlarged view, partly in central longitudinal section and partly in elevation, of a left-hand brush of the machine. Fig. 9 is a view of the inner end of the brush. Fig. 10 is an enlarged top plan sectional view taken in line $z\ z$ of Fig. 2, showing the change-gear for driving the brush. Fig. 11 is an enlarged central longitudinal section of the right-hand portion of the ironer as supported between a steam-chest and the aforesaid disk, this view being a continuation of Fig. 5. Fig. 12 is a view partly in central longitudinal section and partly in elevation of a right-hand brush of the machine, and Fig. 13 is a partial top plan view of the hot-air pipe for the lower brushes of the machine.

The movement of the thread to be glazed and polished by my said machine is as follows: The thread 1 unwinds from the spool 2 and passes over the whirl 3 of the shaft 4 and thence under another whirl, 5, which is loosely mounted on a swinging lever 6, arranged to immerse the thread in the liquid of a sizing-box. From the whirl 5 the thread next passes over a stationary shaft 7, which is mounted in brackets 8 8, secured to the end frames of the machine. From the shaft 7 the thread passes over two cloth-covered shafts 9 9, rotatably mounted in said brackets and beneath a spring-controlled roller 10, which is arranged to press the thread against the said cloth-covered shafts and at the same time to squeeze out the surplus liquid from the thread. From the roller 10 the thread next passes up through a thread-guide 11, mounted on the frame of said roller 10, and which guide directs the thread to a twisting-head 12, mounted on a bracket which is secured to the front frame of the machine. Said twisting-head 12 is driven by a gear which receives motion from the main driving-shaft of the machine. From the twisting-head 12 the thread next passes through the eyes of two thread-guides 13 13, which are secured upon the said twisting-head, and these guides are arranged to direct the thread to contact upon the peripheral surfaces of two cylindrical brushes 14 14, rotatably mounted in brackets which are secured to the end frames of the machine. The brushes 14 14 are situated one over the other, and from the upper one of said brushes the thread passes to the rear of a whirl 15 of a thread-tension device, which is adjustably secured upon the front frame of the machine. From the said tension device the thread next passes up to contact upon the peripheral surfaces of two other similarly-arranged brushes 14 14, from whence the thread passes to the rear of a whirl 15 of another tension device. The thread is now directed to contact upon the peripheral surfaces of steam-heated ironers 16 16, which are rotatably mounted upon the machine-frame and driven from the main shaft of the machine. From the ironers 16 16 the thread next passes to the rear of a whirl 15 of another tension device mounted on the upper portion of the machine-frame. From this last tension device the thread passes between two projecting guide-wires 17 17, which form one pair of a series secured in a horizontal shaft 18. The ends of this guide-wire shaft 18 are fixed to the outer ends of two levers 105 of a traversing mechanism, hereinafter described. Above the guide-wire shaft 18 and extending parallel therewith is another shaft, 19, whose ends are secured to the said levers 105. On the shaft 19 is loosely mounted a series of rollers 20 20, provided each with an external groove which is situated centrally of each pair of wires 17 of the shaft 18. These grooved rollers 20 are arranged to direct the thread to the winding-spools 21 21.

Referring to Figs. 1 and 3, the feed-rolls or cloth-covered shafts 9 9 have each a spur-gear rigid at one end thereof, and these gears rotate in the same direction by means of an intermediate spur-gear 22, which is rigid upon a short shaft 23, and said shaft 23 is mounted in one of the brackets 8. On the outer portion of the shaft 23 is keyed a cone-pulley 24, that is driven by a straight belt 25, which has connection with another cone-pulley, 26, that is keyed to the main driving-shaft 27. The driving-shaft 27 has a pinion-gear 28 made fast upon it, and said gear 28 meshes with a gear 29, that is loosely mounted on a fixed stud-shaft 30, which is secured to the end frame A of the machine.

On the hub of the gear 29 is keyed a pulley 31, which has a belt connection 33 with a pulley 34. Said pulley 34 is keyed upon the hub of a pinion-gear 35, which is loosely mounted on a stud-shaft 36, secured to the end frame A. The gear 35 engages a gear 37, that is keyed upon the end of a cam-shaft 38, which drives the traversing mechanism for the winding-spools 21 21.

Referring to Figs. 1 and 2, each of the brushes 14 14 14 14 is driven by a gear 39, made fast on one end of each brush-shaft 40. Each gear 39 engages a change-gear 41, which is loosely mounted on a stud 42. Each stud 42 has an enlarged integral circular head $42^a$ at its outer portion thereof to retain the change-gear in position upon the stud, and the inner portion of said stud is reduced in diameter to form a shoulder which abuts the outer face of a bracket 44, secured to the end frame, as seen in detail of Fig. 10, and this inner portion of the stud is provided with a nut $42^b$ to impinge against the said bracket and hold the stud in a fixed position upon the same. Each bracket 44 is provided with an elongated slot 43 to permit adjustment of the stud 42 to the position desired upon the bracket, whereby a different diameter of change-gear 41 may be used to accommodate the speed required to rotate the brushes or ironers.

The driving-shaft 27 has a cone-pulley 45 made fast upon it. Said cone-pulley has a straight belt 46, which drives a pulley 47. This pulley 47 is made fast upon the hub of a gear 48, which is loosely mounted on a fixed stud-shaft 49 of the machine-frame. Said gear 48 meshes with another gear, 50, of equal size, and which latter gear is rigid upon the tubular shaft of one of the steam-chests of the ironers. This gear 50 meshes with the uppermost change-gear 41, whereby all of the gears 39 and 41 are driven so that all brushes and ironers revolve in the same direction, as indicated by the arrows in Fig. 2. A crossed belt 51 from the cone-pulley 45 drives a pulley 52, that is keyed upon the end of the shaft 53, by which the twisting-heads 12 12 are rotated. A straight belt 54 from the said cone-pulley 45 drives a pulley 55, which is rigid upon the end of the whirl-shaft 32, that drives the winding-spools.

In Figs. 5 and 11 I represent my improved construction of the ironers for glazing and polishing the thread. These ironers have two circular steam-chests 56 and 57, and said steam-chests have each an outer and centrally-projecting tubular shaft 58 made fast thereon, and which tubular shafts are rotatably mounted in boxes 59 of the frames A and B. Bonnets 60 60 are secured upon the steam-chests 56 and 57 by bolts 61 61, and a tubular shaft 62 extends between said bonnets and is rigidly secured thereto. Each end of the tubular shaft 62 is plugged, as seen at 63. The shaft 62 is adapted to support a disk 64, which is situated centrally between the steam-chests 56 and 57. This disk 64 is divided in halves, which are secured together by screws 65 65, that enter flanges 66 66, integral with the halves, as seen in Fig. 7. Tubular steam-shafts 67 67 communicate with the steam-chests 56 and 57, and said shafts form a series divided equidistantly apart throughout the circle of the steam-chests. The steam-shafts 67 have externally-screw-threaded ends which enter freely through circular openings formed in the bonnets 61, and nuts 68 68 impinge against packing-rings 69 69, adjoining each side of said bonnets and hold said steam-shafts 67 fixedly secured to the same. Upon each steam-shaft 67 are mounted two ironers 16 16, the outer ends of which have hubs 71, provided with screws 72 to impinge against the said steam-shafts 67 and hold the said ironers rigid to the same. The inner ends of each of the ironers 16 16 have hubs 73, with projecting half-annular flanges 74, adapted to enter through the circular openings 75, formed in the disk 64. These annular flanges 74 of the ironers 16 16 when in the openings of the said disk abut together, and thus each pair of ironers in the series are locked and turn together with the steam-chests. A pipe 76 enters one tubular shaft 58, which is externally screw-threaded at its outer end to receive a stuffing-box 77, as shown in Fig. 11. Said pipe 76 delivers steam to the steam-chest 57 from a boiler, (not shown,) and from said steam-chest the steam passes through each of the tubular shafts 67 67 into the opposite steam-chest 56, thence out through the exhaust-pipe 78, whose end portion enters the tubular shaft 58 of the steam-chest 56. Said shaft 58 is externally screw-threaded to receive a stuffing-box 79, as shown in Fig. 5. Upon the tubular shaft 58 is keyed the gear 50, which receives motion to rotate the ironers. There are an even number of ironers throughout the circle of the steam-chests. In Fig. 4 I show six ironers, although it will be understood that any even number, such as four, six, eight, or more ironers, may be used to operate upon the thread. Each pair of ironers 16 has a series of conical sections, as 16ª 16ª, one pair of ironers having their conical sections inclined in one direction, while the next adjacent pair of ironers have their conical sections inclined in the opposite direction. These ironers 16 rotate with the movement of the thread, as indicated by the arrows in Fig. 4. By having the conical sections 16ª of the ironers arranged as described the thread is caused to take a diagonal course, first in contact at a point upon the smaller diameter of sections, then carried in the opposite diagonal course upon the larger diameter of sections, in the manner as indicated by broken lines in Fig. 1. So by having the peripheral surfaces of one pair of ironers inclined opposite to that of the peripheral surfaces of the next following pair of ironers the threads are drawn to the proper tension, and thus the thread is lengthened accordingly and at the same time is rolled round and smooth. In this manner the thread is evenly polished.

In Figs. 8 and 12 I represent my improved construction of the brushes for laying the projecting fibers of the thread. A suitable bracket is bolted to each end frame A and B of the machine, and each bracket is provided with a box 80, which is bored to receive a hub 81, formed at each outer end of the cylindrical shells 82 82, forming the body of said brushes. These shells 82 have each an inner hub 83 with a corresponding half-annular flange 84, which flanges when in operation abut together and form a locking arrangement whereby the said brushes rotate together. Between the boxes 80 and the annular flanges 84 each pair of shells 82 is provided with bristles 85. To retain each pair of cylindrical brushes 14 in axial alinement with each other, the hubs 81 and 83 of each shell are centrally bored to receive a shaft 40, upon which the hubs 81 are keyed. Each brush 14 is driven by a change-gear 41, which engages two of the gears 39 39 of the left-hand hubs of said cylindrical shells, the upper gear 41 being driven by the gear 50. There are four pairs of these brushes horizontally mounted one above the other on the front of the machine, as seen in Fig. 1. Beneath the lower pair of brushes 14 is arranged a pipe 87, fixed upon the machine-frame, and said pipe receives hot air from an oven. (Not shown.) The air in the pipe 87 is drawn through by means of a suction-fan. (Not shown.) Said pipe 87 is provided with a series of perforations 88, formed in its upper surface, as seen in Fig. 13, for the purpose of allowing a proportionate part of the hot air to discharge upon the bristles 85, according to the speed rotation of the suction-fan. By this discharging of hot air externally upon the bristles the liquid sizing contained in the thread is made approximately dry before the thread receives its finishing polish by the ironers. After the brushes have laid all the projecting fibers of the thread and the ironers have made the same round and smooth the thread next passes to the traversing mechanism for feeding it to the winding-spools. The construction of this traversing mechanism is as follows: A horizontal shaft 38 is rotatably mounted in a box of each end frame A and B, and said shaft has two heart-shaped cams 100, which are keyed to said shaft 38 and situated near to each of the said end frames. Above the shaft 38 and extending parallel therewith is located a rock-shaft 102, whose ends are mounted in a support 101 of each end frame A and B, as seen in Fig. 3. Upon the rock-shaft 102 are fixedly secured two levers 105, which carry the shafts 18 and 19, having the guide-wires and rollers, as hereinbefore explained. Two arms 103 are fixedly secured to the shaft 102, and said arms are provided each with a roller 104, which is situated to contact upon the face of a cam 100. The cams 100 are both set to the same angular position on the shaft 38.

The operation of the traversing mechanism is as follows: The shaft 38 receives motion from the gear 37. When the rollers 104 of the arms 103 are at the highest point upon the faces of the cams, as at 100ª in Fig. 3, the levers 105 will be elevated to their highest position, so that the threads are directed from the grooved rollers 20 to the uppermost part of the winding-spools 21, as seen in said figure. As the cams 100 turn from the position described the levers 105 swing down by their weight, and this downward movement of the levers 105 terminates when the rollers 104 will be in contact upon the lowest point of the cams, as at 100ᵇ in Fig. 4, when the threads are then directed to the lowermost part of the winding-spool.

The means for driving the spool-spindles is as follows: Referring to Fig. 4, 89 is a whirl made fast upon the shaft 32, and said whirl 89 has a band or cord connection 92 with a whirl 90, which is made fast upon the spool-spindle 91. Intermediate the whirls 89 and 90 is fixedly secured a standard, which has a grooved roller 94 at its upper extremity to receive the upper portion of the band or cord 92. A lever is pivotally mounted on the standard and has a grooved roller 96 at its upper end to engage upon that upper portion of the band or cord which is between the whirl 89 and roller 94. A rod 97 has one end connected to the lower end of the lever, which is pivoted to the standard, and said rod is provided with a series of teeth arranged to engage upon the edge of an angle-strip which is secured to the machine-frame, so arranged that by lifting the rod and drawing it forward the operator is enabled to swing down the roller 96 into frictional contact upon the band or cord, and thus the rotative speed of the winding-spool is made proportionate to the traversing movement of the thread upon it.

This invention relates to improvements in the thread-dressing machine shown and described in Letters Patent of the United States, No. 702,786, issued to me June 17, 1902.

Having described my improvements, what I claim, and desire to secure by Letters Patent, is—

1. In a thread-dressing machine, the combination, of two brackets fixed to the machine-frame and each provided with a tubular bearing; two cylindrical shells, coaxially of each other, and having outer tubular hubs rotatably mounted in the bearings of said brackets and inner tubular hubs having integral corresponding half-annular flanges which together form a circle; bristles secured in the peripheral surfaces of said cylindrical shells; a shaft extending through the said shells and keyed to the outer hubs thereof; a gear keyed upon the end of said shaft arranged to receive motion to rotate said cylinders; and a perforated pipe fixed upon the machine-frame adapted to discharge hot air upon the bristles of said shells, substantially as set forth.

2. In a thread-dressing machine, the combination of two brackets fixed to the machine-frame and each provided with tubular bearings; two cylindrical steam-chests having outer tubular shafts rotatably mounted in the bearings of said brackets and a series of fixed steam-shafts communicating with the steam-chests, a tubular shaft having its ends secured centrally to said steam-chests; means to rotate said steam-chests; a disk made fast upon the tubular shaft of said steam-chests and provided with a series of circular openings; a pair of ironers made fast upon each steam-shaft of the series fixed on said steam-chests, and said ironers having inner tubular hubs with integral corresponding half-annular flanges which fit in the openings of said disk, substantially as set forth.

3. In a thread-dressing machine, the combination, of two brackets fixed to the machine-frame and each provided with tubular bearings; two cylindrical steam-chests having a series of steam-shafts communicating with the steam-chests and outer tubular shafts rotatably mounted in the bearings of said brackets; a gear keyed upon one of the tubular shafts and arranged to rotate said steam-chests; a pair of ironers fixed upon each steam-shaft of said steam-chests, each pair of said ironers provided with a series of conical sections, so arranged upon the shafts that one pair of ironers have their conical surfaces inclined in one direction while the next adjacent pair of ironers have their conical surfaces inclined in the opposite direction, substantially as shown and for the purpose specified.

4. In a thread-dressing machine having brushes and ironers rotatably mounted on the machine-frame, the combination, of a gear keyed upon each shaft of said brushes and said ironers; brackets rigidly secured to the machine-frame and provided with elongated slots; studs having lateral adjustment in the slots of said brackets; and change-gears rotatably mounted on said studs to engage with the gears of said brushes and ironers, substantially as set forth.

In testimony whereof I affix my signature in presence of two witnesses.

GEORGE A. FREDENBURGH.

Witnesses:
ELMER WALKER,
DANIEL E. LOCKE.